United States Patent [19]

Riggs et al.

[11] Patent Number: 4,940,551

[45] Date of Patent: Jul. 10, 1990

[54] METHOD FOR PH CONTROL

[76] Inventors: James B. Riggs, 2609 24th St., Lubbock, Tex. 79410; R. Russell Rhinehart, 3920 96th St., Lubbock, Tex. 79423

[21] Appl. No.: 354,344

[22] Filed: May 19, 1989

[51] Int. Cl.$^5$ ............................................. C02F 1/66
[52] U.S. Cl. ................................... 210/743; 210/96.1; 210/101; 210/143; 364/148
[58] Field of Search ............... 210/743, 744, 749, 96.1, 210/101, 143, 199; 364/148

[56] References Cited

U.S. PATENT DOCUMENTS 3,899,294 8/1975 Magiros ............................. 210/743
4,053,743 10/1977 Niemi ................................. 364/148
4,670,157 6/1987 Nicksic ............................... 210/696

Primary Examiner—Peter Hruskoci
Assistant Examiner—Krisanne Shideler

[57] ABSTRACT

A method for controlling pH of an effluent stream or batch process is provided in which multiple in-process reagent concentration and pH data pairs are used to characterize the titration curve of the influent stream or batch fluid. Reagent is added in two or more portions in either space or time to generate several resulting pH readings and to provide rapid, reliable, and locally valid titration characterization. The titration curve can then be used to determine the required reagent addition.

14 Claims, 3 Drawing Sheets

METHOD FOR PH CONTROL

CROSS-REFERENCE LIST

Rhinehart, R. R., and J. Y. Choi, "Process-Model Based Control of Wastewater pH Neutralization," Proceedings of the ISA/88 International Conference and Exhibit, *Advances in Instrumentation,* Houston, Texas, Oct. 16-21, 1988, paper 88-1448

Choi, J. Y., and R. R. Rhinehart. "Internal Adaptive Model Control of Wastewater pH," *Proceedings of the 1987 American Control Conference,* Minneapolis, Minn., June, 1987, paper FP9-4:00

Moore, R. L., *Neutralization of Waste Water by pH Control,* ISA Monograph Series, Instrument Society of America. Research Triangle Park, N.C., 1978.

Shinskey, G., *pH and pION Control in Process and Waste Streams,* John Wiley and Sons, New York, N.Y., 1973.

Grey, D. M., "New Solutions to pH Control Problems," *Pollution Engineering,* April, 1984.

Leeds and Northrup Instruments, 7084 Microprocessor pH Analyzer/Controller, Product Bulletin C2.1213-DS, 1984.

Margiros, U.S. Pat. No. 3,899,294, "Method for Automatic Feedforward Control of Effluent pH." Aug. 12, 1975

Gustafsson, T. K., and K. V. Waller, "Dynamic Modeling and Reaction Invariant Control of pH," *Chemical Engineering Science.* Vol. 38, No. 3, 1983, pp 389-398.

Lee, P. L., and G. R. Sullivan, "Generic Model Control (GMC)," *Computers and Chemical Engineering,* Vol 12, No. 6, p-573, 1988.

SUMMARY OF THE INVENTION

The present invention is designed to provide a means of controlling the outfall (effluent) pH of a stream or the pH of a batch by controlling the addition rate of reagent. pH is a measure of the hydrogen ion concentration in a liquid, and knowing one is equivalent to knowing the other. The said invention is capable of maintaining the outfall pH as the influent stream changes flow rate; or as either the influent stream or the batch changes composition, buffering capacity, temperature, or other related factors. Specifically, the present invention is able to continuously develop an adequate estimate the titration curve of the influent stream or batch. The preferred method is to inject the reagent at several locations in a process stream. However, time varying injections may also be used. The injected amounts cause a pH change, and can be used to characterize the titration curve of the process fluid. Once the titration curve is "known", the total rate or amount of reagent needed to control the pH can be determined and the total required amount of reagent can be implemented.

The present invention is able to characterize the titration curve on-line and in the face of either gradual or sharp changes in the influent or batch characteristics. The present invention is of particular utility where the composition, flow rate, or temperature change with time for a stream that is to be neutralized. However, its utility extends to control to any valid pH of both continuous flow and batch processes.

Again, refering to FIG. 1, the dashed lines indicate titration curves that are estimated by the pH controller of this invention. The controller uses the on-line process measurements indicated by the points labled as "influent," "intermediate," and "outfall" to generate the modeled (estimated) curves, and from these curves can determine the base concentration required to neutralize the acid.

Figure 2:
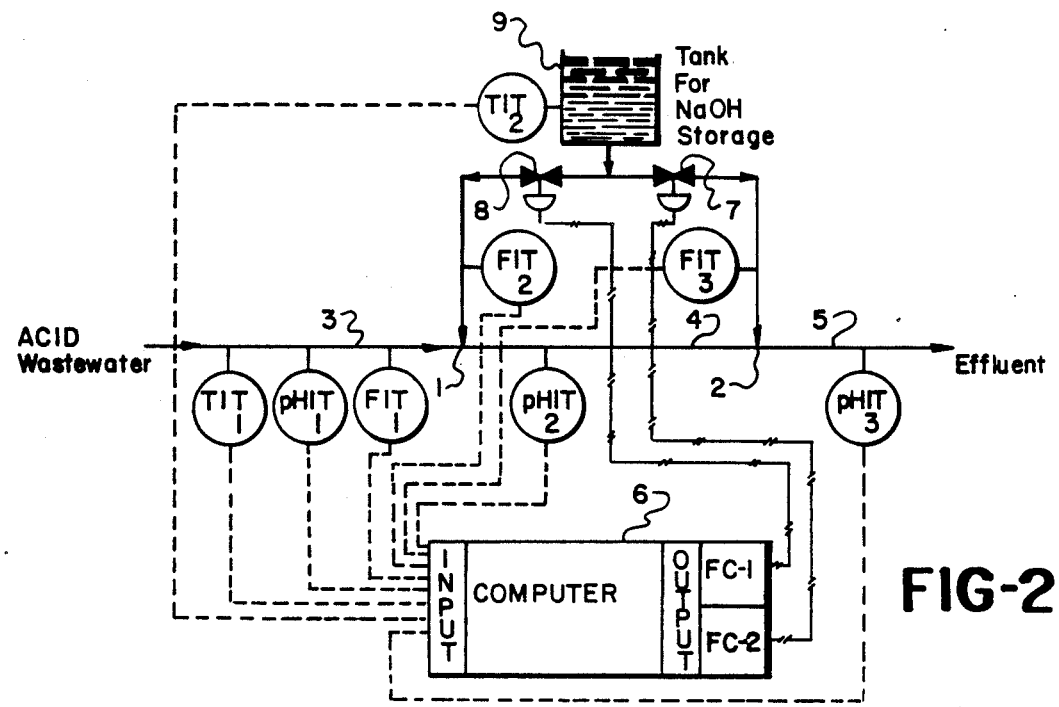

FIG. 2 illustrates one embodiment of the invention for the in-line control of a continuous flow influent. The influent may be acidic wastewater from a chemical process; and, in response to plant conditions will change in flow rate, temperature, and the composition of several components. The reagent may be NaOH mixed to a desired concentration in water. The reagent components and influent components both mix and react rapidly in comparison to the transport delays from reagent injection and subsequent measurement. The effluent may be discharged into the environment and need to be controlled to a pH range of 6 to 9, preferably 7 pH units. The influent flow rate, pH, and temperature are measured and transmitted to a computer. Part, perhaps 60%, of the reagent is added to the influent at point 1, and the pH of the intermediate process stream is subsequently measured at point 4 and the signal transmitted to the computer. The remaining part of the reagent is added at point 2, and the pH of the outfall portion of the process stream is then measured at point 5 and the signal is transmitted to the computer. The rate of reagent addition is controlled by valves, and each reagent flow rate and the reagent temperature are measured and transmitted to the computer. The computer manipulates the valve stem position to obtain the desired flow rates.

Figure 3:
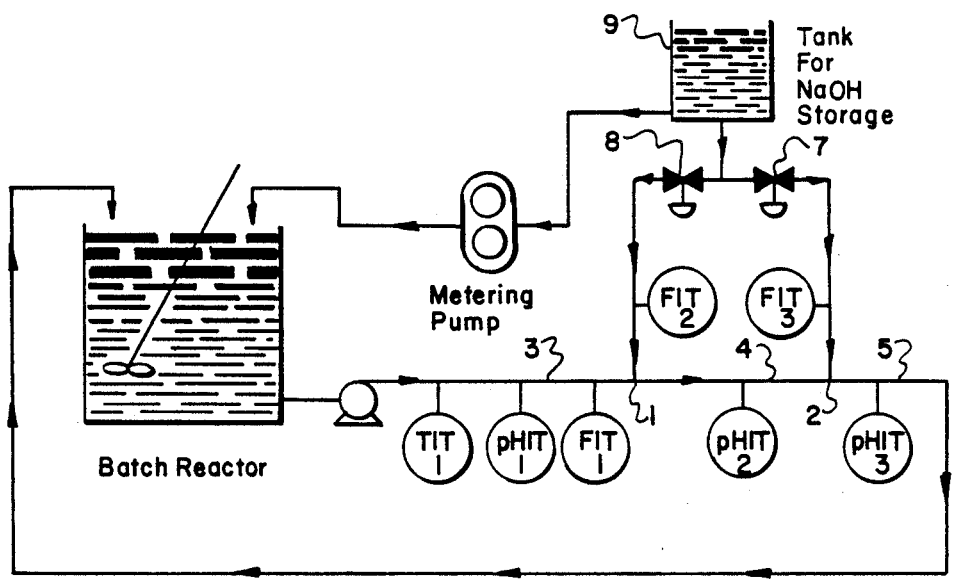

FIG. 3 represents one embodiment of the invention for batch pH control. A volume of multicomponent, but mildly acidic liquid is contained in a mixing tank and a basic titrant solution is used to adjust its pH to a value of 7.5. The batch of liquid may, perhaps, contain organic waste slurry that is undergoing anaerobic digestion in a waste treatment step. Some bacteria are producing the desired product, methane; however, other bacteria are producing organic acids. Since an acidic medium inhibits the methane production, base must be added. Since the composition of the reaction mixture is continually changing due to both reaction and feed waste addition, the titration curve is continually changing. A stream containing a portion of the batch fluid is continuously removed and recycled to the batch. In an arrangement similar to that of the in-line process, base is added to the recycle stream in two portions and pH measurements are used to characterize the influent (the batch) fluid. Base is then added to the batch by a metering pump, in proportion to the batch size. The computer manipulates the metering pump as well as the valves.

Figure 4:
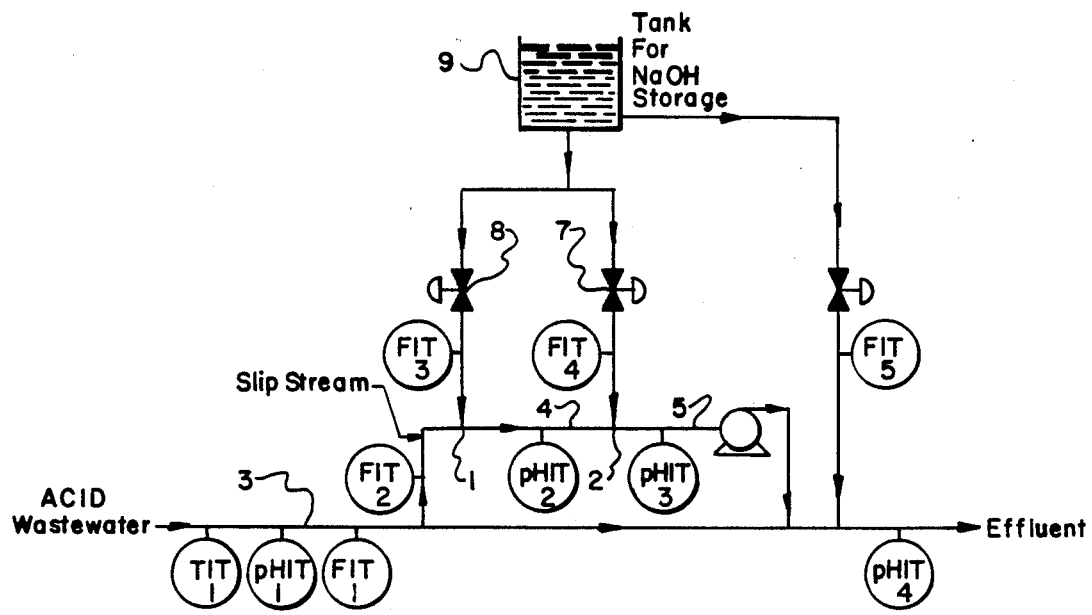
Figure 5:
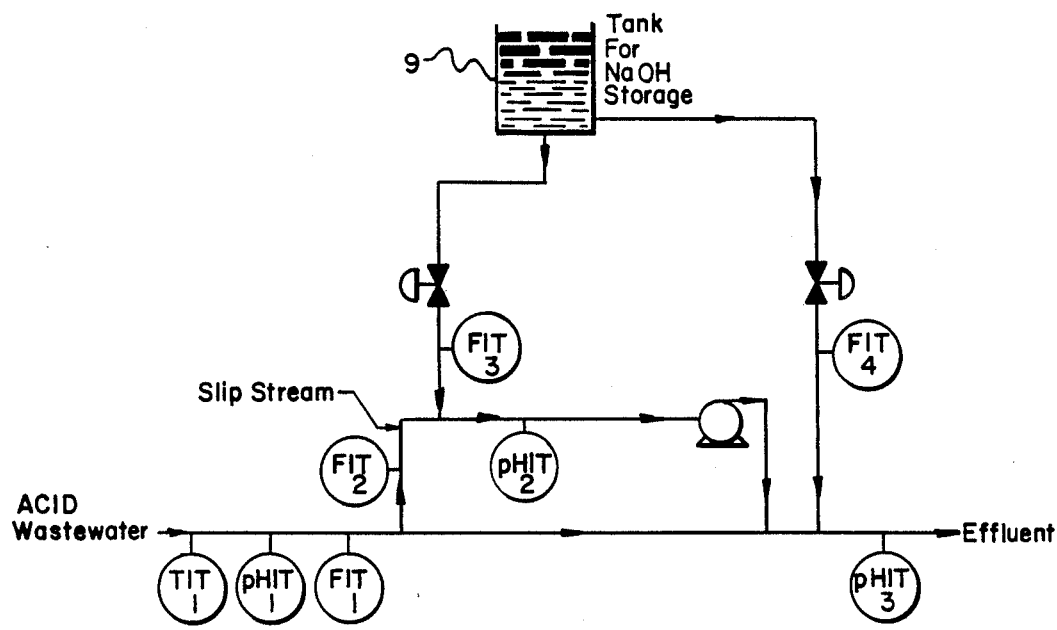
Figure 6:
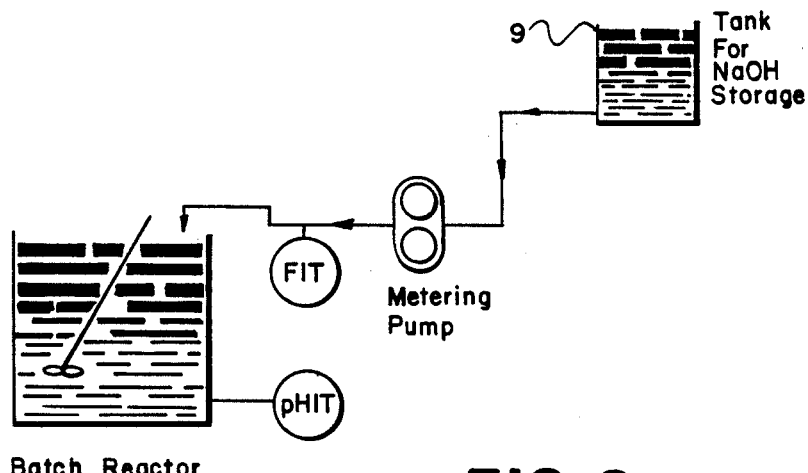

FIGS. 4, 5, and 6 represent three other methods for obtaining multiple pairs of reagent concentration in the process fluid and resulting pH. In FIG. 4 the slip stream of process fluid is removed from the process stream, and becomes the intermediate section into which reagent is added. In FIG. 5 only one reagent portion is injected into the slip stream intermediate portion. In FIG. 6 reagent is added to a batch of process fluid in order to generate a sequence of data pairs in time.

BACKGROUND FOR THE INVENTION AND PRIOR ART

Control of pH is usually a very difficult problem because the influent flow rate, concentrations of various acids, bases and buffering salts, and temperature change with time. The source of the difficulty of pH control is the result of two major factors: The nonlinearity of the titration curve at any particular point in time and the time variation in the shape of the titration curve as the influent composition and temperature change.

The nonlinearity of the titration curve is most acute for strong, unbuffered acids or bases. For such cases, near a pH of 7 pH units, addition of a relatively small amount of acid or base results in a drastic change in pH. But if the pH is acidic or basic, then relatively large amounts of acid or base result in only small changes in pH. Thus when the pH is near 7 pH units, the process has an extremely high gain and when the process is not near a pH of 7 pH units, the process gain is quite small. Over the normal range of operation with strong acids or bases, it is not unexpected to have the process gain change by a factor of 10,000,000,000. Because proportional-integral (PI) controllers assume that the process is linear, the application of a classical PI controller for pH control is usually ineffective (Moore, 1978).

The composition of the influent stream can be made up of varying amounts of strong acids or bases, weak acids or bases, and buffering salts. As the composition of the influent stream changes, the shape of the titration curve can change drastically. When a solution contains a highly buffered weak acid, the titration curve will have a very gradual change in pH upon neutralization. This contrasts with a very sharp pH change near a pH of 7 pH units for a strong acid. As a result, as the composition of an influent stream changes over time the process gain will change even if pH is maintained. For industrial wastewater neutralization, the process gain at a pH of 7 pH units may change by a factor of 1,000 due to the time variation of the influent composition (Moore, 1978).

Control of pH is important to many processes including: boiler water treatment, chemical and biological reaction, municipal waste digestion, acid pickling/etching processes, cooling tower water treatment electrohydrolysis, coagulation/precipitation processes, chemical reactor feeds and wastewater neutralization.

Because of the importance of pH control, there are many publications of applicable techniques (See for instance references in Rhinehart and Choi, 1988, and Grey, 1984). Because of the difficulty of pH control, many include large blending volumes batch processing, or continual operator involvement and are economically expensive.

Shinskey (1973) provides a classical discussion of pH control. In addition, he proposes a nonlinear PID pH controller which utilized a deadband about pH of 7 pH units and a constant controller gain outside the deadband. While this controller represents an improvement over PID control for neutralization, it suffers from three major limitations: (1) it is designed only for neutralization (2) at low buffering, it is difficult to fit the highly nonlinear pH function with such a simple function, and (3) most importantly, as the shape of the titration curve changes due to changes in acid and buffering salt composition, this method would require retuning although no provisions for tuning on-line are given.

Margiros, U.S. Pat. No. 3,899,294, presents a method for titration curve identification by simply titrating a slip stream of the main effluent stream. Then the titration curve is used to select the reagent flow rate to attain the desired pH. This procedure is relatively expensive since an automated titration system must be used to obtain the titration curve. In addition, the titration time for such an automated system may be significant in comparison to the fluid residence time in the process; therefore, when composition changes of the process stream occur, the analytical dead-time will reduce the effectiveness of the controller.

The Leeds and Northrup Model 7084 pH controller uses a similar technique, but the titration curve is generated off-line from an influent sample and manually programmed into the controller as a 10 or so point data set This controller suffers from the same events as the Margiros patent, but, since the manual titration and data entry are relatively slower, the deadtime problem is amplified.

Gustafsson and Waller (1982) proposed reaction invariant control of pH. But in order to apply this algorithm, the concentration of at least one component of each acid base system present must be estimated. This is not practical for an industrial acid waste problem where many streams of unknown composition and varying flow rates are combined to provide the feed to the pH control system.

We have found a method that overcomes the disadvantages and limitations of the methods just described. The present invention provides a means to rapidly, accurately, and reliably identify the titration curve of an influent stream or a batch process fluid through multiple but complimentary injections of the reagent and measurement of resultant pH measurements. Once the titration curve is "known", accurate pH control can be obtained. The method is particularly effective when applied to systems that receive significant changes in composition of the process stream, or changes in composition of a batch process fluid. Other objects and advantages will become apparent from the following description.

DETAILED DESCRIPTION OF THE INVENTION

Overview

The present invention provides a method for automatically controlling the pH of either a stream or a batch of process fluid. For a process fluid stream, the invention in general comprises the steps of:

a. Adding acid or base (reagent) in two or more portions to the entire or part of the process fluid stream and monitoring the inlet, intermediate and outfall pH readings. Or, adding the reagent in a time varying manner and monitoring the time varying pH.

b. Using the pH readings and the flow rates of the process fluid and reagent streams to characterize the titration curve for said process fluid stream.

c. By measuring the flow rate of said process fluid stream and using said titration curve, determine the total flow rate of reagent that should be added to said process fluid stream in order to attain the desired pH in the outfall stream.

d. Transmit complimentary portions of the said total flow rate of reagent to a primary flow control device (or set of them) in order to add the reagent flow rate to said process fluid stream.

For a batch process, the invention in general comprises the steps of:

a. Adding acid or base (reagent) in two or more portions to the batch of process fluid and monitoring the initial, intermediate, and final pH readings. Or, continuously recycling a portion of the batch fluid as a slip stream, adding titrant to the slip stream in two or more portions, as described for the continuous process fluid stream, and measuring the pH values.

b. Using the pH readings and the flows and volumes of the batch fluid and reagent additions to characterize the titration curve for said batch.

c. By using the volume of said batch and using said titration curve, determine the total volume of reagent that should be added to said batch in order to attain the desired final pH.

d. Transmit appropriate portions of said total volume of said reagent to the reagent addition volume control device (or set of them) in order to add the acid or base to said batch.

The multiple addition of reagent to the material in the process stream or batch allows for rapid characterization of the general shape of the titration curve of the process fluid. For example, if an acidic process stream were to maintain the same acid strength but were to shift toward less buffering, the intermediate pH readings would decrease. Also, for example, if biological reactions were producing acid in a batch and base were being added to maintain neutrality, then the batch fluid composition would move to greater buffering and larger base volumes would be required to correct a given pH offset. Since such changes in the process titration curve are likely to change over a time period on the order of an hour, the present invention provides a means of relatively rapidly and accurately tracking the transient changes in the titration curve of the process fluid. Thus it allows for accurate and responsive pH control. It will become evident that the accurate and rapid characterization of the titration of the process stream provided for by the present invention overcomes the problems and limitations found in prior art feedforward/feedback pH control systems.

In an elementary embodiment of the invention for a continuous flow process, one could divide the total reagent flow into ten equal flow portions, measure ten resulting pH values, plot pH versus cumulative reagent flow, find the cumulative reagent flow on the plot that would give the desired pH, adjust all flows accordingly, and repeat. The procedure can be automated on a digital computer. Perhaps the "plot" could be the set of parameters that define the cubic spline that goes through the cumulative reagent versus pH points, then the computer could easily use those parameters to identify the required total reagent flow. However, ten injections means ten devices to purchase and maintain. And, if insufficient reagent flow is initially injected, the computer will have to extrapolate the reagent versus pH plot, and such can be very inaccurate.

Consequently, in a preferred embodiment of the invention a digital electronic computer models the composition of the influent or batch. Once the composition of a fluid is "known" the titration curve can be calculated; so, knowledge of the composition is equivalent to knowing the entire titration curve. Extrapolation is accurate and few reagent injections are necessary. However, the composition need not be exactly known. A set of fictitious components can be attributed to the fluid and properties of those components can be calculated such that the titration curve of the fictitious set approximates that of the process fluid. In this manner, the titration curve of the fictitious fluid provides an estimated titration curve of the process fluid.

Detailed Description of One Embodiment of the Invention

FIG. 2 shows one example of how the present invention might be applied for the neutralization (to a pH of 7) of an acidic process wastewater stream (#3). The acidic stream could come from various unquantified process streams. For instance, the wastewater composition would change in time and could range from concentrated hydrochloric acid that is periodically used to wash heat exchanges to a weak, highly buffered acid that is continuously produced as a by-product of a cellulose acetylation process. Most large refineries or chemical plants have one or more streams of this type. For this case, it is assumed that reaction of the basic reagent (#9) with the acidic process stream occurs at a high rate, and that the in-line process mixing is thorough, so that the transport times between the points of reagent injection (#s 1 and 2) and the points where the resulting pH is measured (#s 4 and 5, pHIT-2 and pHIT-3 respectively) are sufficient to effectively obtain complete (thermodynamic equilibrium) reaction. The base reagent in this case would be a strong, highly ionizable base such as NaOH or KOH. After the process stream is treated for pH neutralization (#5), it might be discharged into a river, lake, or other body of water, or sent to a waste treatment process, or recycled for re-use. As a result, it is imperative to maintain the pH of the outlet of the process stream reasonably close to a pH of 7 pH units (e.g. pH between 6 and 9) so that the discharge does not adversely effect the environment, the subsequent waste treatment process, or the subsequent re-use process.

Referring now to the drawing, the acidic process stream in the influent section (#3) is measured for temperature (TIT-1), pH (pHIT-1), and flow rate (FIT-1). After the first portion of base is added to the process stream at point #1, the resulting pH of the first mixed fluid in the intermediate section is measured at point #4 (pHIT-2). Finally, a second portion of the base is added at point #2 and the resulting pH of the second mixed fluid in the outfall section is measured at point #5 (pHIT-3). The temperature at point #9 (TIT-2) and flow rates of the two base injection flows are also measured (FIT-2 and FIT-3). Each of these measurements is transmitted to the digital electronic computer (#6) which provides the control function for this pH control process.

Figure 1:
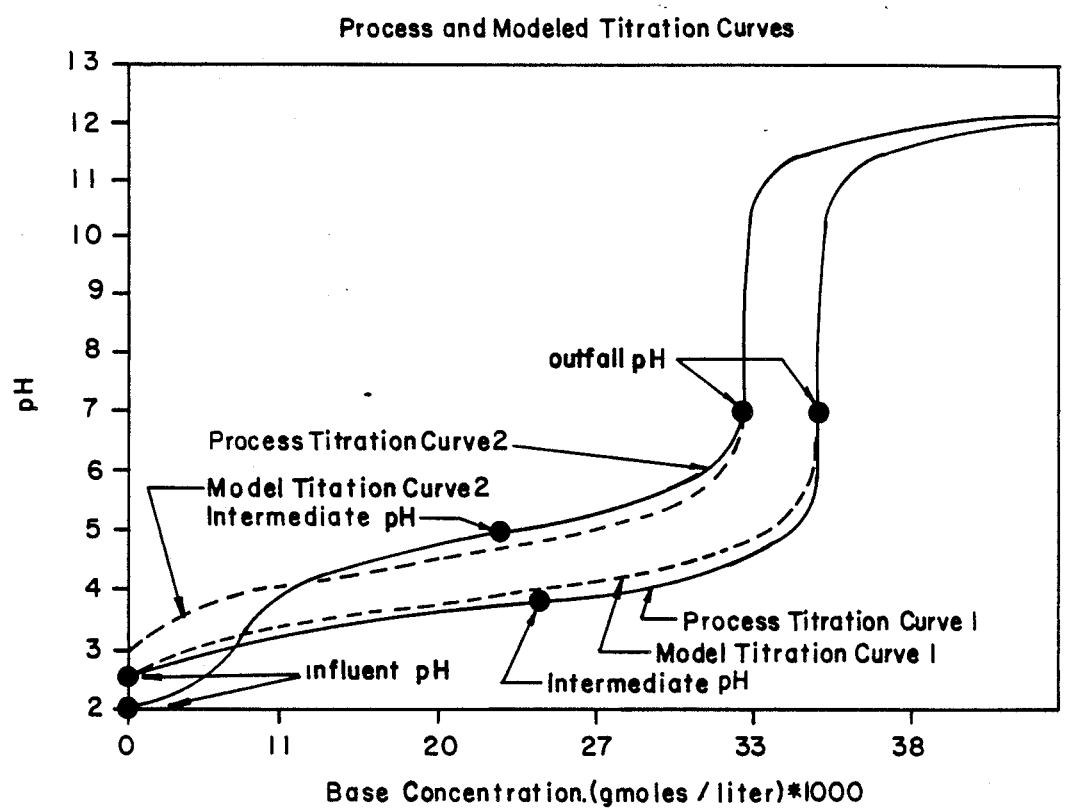
FIG. 1 illustrates several titration curves and their role in the invention. The solid lines represent titration curves of a process fluid at two different times when the process fluid composition is different. A titration curve indicates how the pH of a fluid changes as the reagent (in this case a base such as sodium hydroxide) concentration in the fluid changes. For neutrality, one wishes to add reagent so that the pH of the process fluid is 7 pH units. Typical drinking water pH ranges from 6 to 8 pH units, and to meet typical discharge regulations, process wastewater must have a pH between 6 and 9 pH units. The process titration curve 1 on FIG. 1 represents that of a mild acid (one that does not dissociate completely in water). Note that, at a pH of 6 to 8, small changes in base concentration make a very large change in the process fluid pH; while at a pH of 3 or so, large changes in base concentration are required to change to pH. This change in sensitivity of pH to reagent addition is one of the features that makes pH control very difficult. Process titration curve 2 represents that of a mixture of a weak acid (dissociates very little) and a strong acid (dissociates completely) in which the total acid concentration is less than that represented by curve 1, and illustrates several other pH characteristics. Note that at a pH of just below 7 on curve 2, the titration curve has an intermediate slope and indicates that moderate changes in the base concentration make moderate changes in the pH. For control, this means that as the process fluid composition changes in time, the process gain changes and creates another control difficulty. Further, note the points labeled as "influent" on the two curves. These points represent the untreated process fluid. Normally, as acid concentration increases, the pH of the untreated fluid decreases. However, when the composition of the process fluid changes, this relation may not be true, and curves 1 and 2 illustrate such and effect. Although the concentration of acid for curve 1 is higher than curve 2, the pH of the untreated process fluid 1 is higher than that of fluid 2. This unexpected influent pH acid concentration relationship makes conventional feedforward control very difficult.

The controller software that is programmed into the said computer takes the three pH readings, temperatures, three flow rates, and the composition of the base stream and estimates values of the modeled composition parameters that make the modeled pH values match (in a least squares sense) the measured pH values. In this particular embodiment, the modeled composition of the acid wastewater is a single fictitious acid of both unknown concentration and unknown Gibbs free energy of dissociation; however, other models may be appropriate or other model parameters may be adjusted. For such models, estimating values of the model parameters is equivalent to estimating the titration curve. Also, in this particular embodiment, the values of the two model parameters are chosen in a weighted least squares minimization of the three model/process pH deviations. The titration curve of the fictitious acid then is an estimate of the titration curve for the process fluid stream. FIG. 1 illustrates two such fictitious titration curves and the respective process fluid titration curves and the points from which they were obtained. Then using the measured flow rate of the process stream (FIT-1), the computer determines the total flow rate of reagent necessary to provide neutralization to a pH of 7 pH units. Then the total base flow rate is apportioned between the first and final reagent portions, according to a preset ratio, and controlled by flow controllers (FC-1 and FC-2). For example, equal flow rates for FC-1 and FC-2 can be used, but a wide range of complementary portions (60/40 or 30/70 for instance) can also be used for this purpose. The ratio of portions need not remain fixed, but they can be varied as deemed appropriate by either the computer or the operator. Any final flow control element (e.g. valves, pumps, flow splitters, metering conveyor), as appropriate, may be used for the proportioning means. We chose to use valves (#s 7 and 8). The computer would then send out signals to both FC-1 and FC-2 to set their target flow rates. Both FC-1 and FC-2 could be any type of effective flow controllers, but are embodied here as PI algorithms executed by the same computer that defines the model parameters and target reagent flow rate.

It may be obvious that the model parameter identification provides a means to feed forward nonlinear control action on the incoming acidic process stream. In addition, a nonlinear model-based controller can be used to take advantage of the nonlinear feedforward characteristics of the titration identification process as well as to provide nonlinear feedback correction for titration curve error. In order to provide the titration identification for the model based controller, an approximate model for the influent composition must be chosen. In this particular embodiment of the invention, the stoichiometry of an approximate model assumes that the influent contains a single fictitious weak acid of unknown concentration, [A], and unknown Gibbs free energy of dissociation, $\Delta G$. The stoichiometry of the acid/base/water model can be written as:

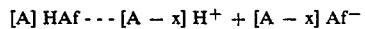

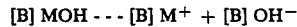

where x represents the amount of fictitious acid that is dissociated, g represents the amount of water that is dissociated, and A and B represent the fictitious acid and the calculated base concentrations. Then one can combine equilibrium relationships and the definition of pH to relate pH, A, B, and temperature to obtain:

$$f(A,\Delta G) = exp(-\Delta G/RT) - (c+B)*10^{-pH}/(A-c-B) = 0 \quad (1)$$

where,
$$c = 10^{-pH} - K_w * 10^{pH}$$

and $K_w$ is the water dissociation constant and is a mild function of temperature and close to a value of $10^{-14}$.

In order to parameterize this model (i.e., select values of A and $\Delta G$), equation (1) can be applied at the three points 3, 4, and 5 and compared to the three pH readings provided by pHIT-1, pHIT-2, and pHIT-3. Since the base addition rate at points 1 and 2, the base composition, and the acid stream flow rate are known, the values for B at the points 3, 4, and 5 can be calculated. Since the process influent and base stream temperatures and all flow rates are known, the temperatures of the streams at points 3, 4, and 5 can be calculated from simple energy balances; and therefore the Kw for each application of equation (1) is known. With a guess of A and $\Delta G$, each equation (1) can be solved for the modeled pH. Then there are three applications of equation (1) and two unknown parameters. Using any valid nonlinear search method, values of A and $\Delta G$ can be found that minimize a weighted sum of squares deviation of the modeled and measured pH's. For this specific embodiment of the invention, with equal weighting factors, the objective function is:

$$OF = \sum_{i=3}^{5} \left[ exp(\Delta G/RT) - \frac{(A - c_i - B_i)}{(10^{-pH_i})(c_i + B_i)} \right]^2 \quad (2)$$

In equations (2) and in equations (3) and (4) that follow, the subscript i refers to the $i^{th}$ point in FIG. 2.

It is usually reasonable to assume that both the base and acid streams are near to ambient conditions and that the heat of reaction is small with respect to the specific heat capacity of the process stream, consequently the temperatures at points 3, 4, and 5 are approximately the same. In this embodiment of the invention, this assumption facilitates the least squares search because $\Delta G$ can be factored out of one of the necessary conditions for a minimum and can be expressed as an explicit function of A.

$$\Delta G = RT \ln \left\{ \frac{\sum\limits_{i=3}^{5} \left[ \frac{(A - c_i - B_i)}{(10^{-pH_i})^2 (c_i + B_i)^2} \right]}{\sum\limits_{i=3}^{5} \left[ \frac{1}{(10^{-pH_i})(c_i + B_i)} \right]} \right\} \quad (3)$$

Accordingly, one is left with a single variable search for the minimum which can easily be performed by the Newton-Raphson method in the following three step procedure.

Step 1: Guess at a value of A and use equation (3) to determine the corresponding value for $\Delta G$.

Step 2: Apply the Newton-Raphson method, equation (4), to obtain the next guess of A.

$$A\text{new} = A\text{old} - \quad (4)$$

$$\frac{\sum\limits_{i=3}^{5} \left[ \exp(2\Delta G/RT) - \frac{\exp(\Delta G/RT)(A - c_i - B_i)}{(10^{-pH_i})(c_i + B_i)} \right]}{\sum\limits_{i=3}^{5} \left[ \frac{-\exp(\Delta G/RT)}{(10^{-pH_i})(c_i + B_i)} \right]}$$

Step 3: If the change in A is less than $10^{-8}$ g-mol/liter, accept that the minimum has been found and calculate $\Delta G$ from equation (3). If not, use the value of A from Step 2 as the next guess and go to Step 1.

The method requires an initial guess for A, and we use the previously converged value. We have explored a wide range of conditions and find that the method usually converges within 5 iterations for even large influent composition changes.

Once parameterized, the approximate model can be used to select control action using a model-based control law. For this embodiment, we use the steady state version of the Generic Model Control (GMC) law of Lee and Sullivan (1988): First calculate a steady state target pH, $pH_{ss}$:

$$pH_{ss} = pH_{IT} - 3 + K_1(7 - pH_{IT} - 3) + \quad (5)$$
$$K_2 \int_0^t (7 - pH_{IT} - 3) dt$$

Then use $pH_{ss}$ to explicitly determine the required base concentration in the outfall stream from the steady state model of the process, equation (1), from above. Then from a simple material balance, determine the total base flow rate required. Parameters K1 and K2 are tuning parameters of the GMC controller and we find that values of 1.25 and 0.020 $s^{-1}$ work well. Note that when pHIT-3 is equal to 7 and when integral term is equal to zero, the controller, equation (5), functions as a nonlinear feedforward controller only. The proportional term (second term) functions to respond quickly to upsets and the integral term provides small, short term correction for process/model mismatch. With the integral correction there is no need for model parameterization at each sampling interval. We find that triggering parameterization at near steady conditions is satisfactory. Alternately triggering parameterization when the effluent pH deviates more than 1 pH unit from setpoint is also satisfactory.

For certain applications other specific embodiments may be preferred. For example, if the wastewater stream flow rate is large, then large devices in FIG. 2 would be required. It may be economically advantageous to take a slip stream portion of the main flow through a small scale neutralization structure as illustrated in FIG. 4 and ratio the neutralizing reagent flow rate to the main stream flow rate. Additionally, if increased precision in pH control is required, the structure shown in FIG. 2 could be used to bring the main process stream to a pH of 5, perhaps, then a subsequent and more precise flow control element can be used to trim to a pH of 7.

An alternate configuration that may have utility is to remove a slip stream portion from the main process stream and to inject a quantity of reagent into the slip stream as illustrated in FIG. 5. A desired quantity of reagent would be injected into the remaining stream of process fluid, so that the outfall stream achieves the desired pH. The three reagent concentration and pH data pairs would be used to characterize the titration curve. While this configuration requires additional slip stream flow devices, it has the advantages that: the slip stream reagent can by varied in time to obtain additional data pairs; that the cost of the small slip stream devices may have an economic benefit; and that, if the slip stream is recombined with the process stream, the mixture provides another reagent concentration pH data pair. The slip stream is an intermediate portion of the main process stream.

Where either a reagent portion or the total reagent is injected on a time varying manner, some of the data must be stored in order to provide extra data pairs for estimation of the titration curve of the process fluid.

An alternate configuration for a batch of process fluid is illustrated in FIG. 6 wherein reagent is added in several discrete portions to the batch to generate the data pairs required for titration curve estimation. This embodiment would be particular applicable if in-batch reactions that generate acid or base are negligible.

The examples have described neutralization to a pH of 7 pH units because this is generally both the most difficult and customary control objective. However, the invention can be used for control to any valid pH value. Further, for simplification, the examples have illustrated the addition of a base reagent to and acidic process fluid. Either acidic or basic reagent may be added; and in some cases, provision to add both must be provided.

The intent of this particular example is to illustrate one embodiment of the invention of a means to characterize the process titration curve from an on-line generation of the necessary data. It is not meant to limit the invention to one embodiment.

Process-model based controllers are not new, and one of us has explored their application to pH control (Rhinehart and Choi, 1988). However, in their single injection, total reagent flow embodiment they found that model parameterization was not always accurate and rapid in the face of either large and rapid changes in composition or of continuing changes in the shape of the influent titration curve. Additionally, in the presence of process measurement noise, parameterization was not reliable. A process-model based controller relies upon rapid, accurate, and reliable parameterization of the approximate model. Such is achieved with the least squares, two-parameter evaluation using the three pH readings. Therefore, the rapid, accurate, and reliable titration curve identification method from on-line data is what provides the present invention the capabilities that the prior art lacks.

What is claimed is:

1. A process for automatically controlling the pH in a process fluid stream by flowing an acid or base reagent stream into the process stream,
   a. said process stream having
      i. an influent section flowing into
      ii. an intermediate section flowing into
      iii. an outfall section,
      iv. a device to measure the process stream flow rate, and
      v. wherein said process comprises the steps of measuring pH in the influent, intermediate, and outfall sections,
   b. also
      i. injecting a first portion of said reagent stream between said influent and intermediate sections,
      ii. injecting a second portion of said reagent stream between said intermediate and outflow sections,
      iii. proportioning the reagent stream between the first and second portions
      iv. measuring the flow rate of the reagent stream, and
      v. controlling the reagent flow rate by estimating a titration curve for the process stream that conforms to the measured pH and injected reagent portions, using said titration curve to estimate the desired reagent flow, and controlling the reagent flow to the estimated desired reagent flow.

2. The process of claim 1 in which there are more than three process stream sections with pH measuring instruments in each section and injecting reagent stream portions between each section.

3. The process of claim 1 in which the process stream is a portion of a batch liquid.

4. The process of claim 1 in which the reagent is injected at a time varying rate.

5. The process of claim 1 including removing a slip stream from the process stream, and injecting reagent is into the slip stream.

6. The process of claim 5 in which one of the process stream sections is the slip stream.

7. The process as defined in claim 1, further comprising:
   a. storing titration curve estimates and amount of reagent added as data, and
   b. increasing or decreasing the proportions of reagent added to the process stream.

8. The process as defined in claim 7, further comprising increasing or decreasing the total reagent flow rate in order to attain desired pH in the outfall stream.

9. The process as defined in claim 1, further comprising performing titration curve and desired reagent flow estimates of the aforesaid steps by a programmed digital electronic computer.

10. The method of controlling the pH of a process fluid comprising the steps of:
    a. first measuring the pH of the process fluid, then
    b. adding a first proportion of an acid or base reagent to the process fluid so that the first proportion of reagent to process fluid is known, then
    c. measuring the pH of said process fluid, then
    adding a second proportion of the reagent to the process fluid so that the second proportion of reagent to process fluid is known, then
    e. measuring the pH of said process fluid, and
    f. from said measurements and proportions, estimating a titration curve for the process fluid, and
    g. from said titration curve, estimating the amount of required reagent to obtain the desired pH, and
    h. adding said amount of required reagent.

11. The method as defined in claim 10, further comprising:
    a. adding more than two proportions reagent to the process fluid, and
    b. measuring the pH of the fluid after each addition.

12. The method as defined in claim 10, further comprising adding the reagent at a time varying rate.

13. The method as defined in claim 10, wherein said amount of required reagent is added as the second proportion.

14. The method as defined in claim 10, further comprising performing titration curve and desired reagent flow estimates of the aforesaid steps by a programmed digital electronic computer.

* * * * *